(12) United States Patent
Yang et al.

(10) Patent No.: US 10,256,454 B2
(45) Date of Patent: Apr. 9, 2019

(54) COMPONENT FOR SECONDARY BATTERY AND MANUFACTURING METHOD THEREOF, AND SECONDARY BATTERY AND MULTI-BATTERY SYSTEM MANUFACTURED BY USING THE COMPONENT

(71) Applicant: LG CHEM, LTD., Seoul (KR)

(72) Inventors: Jung-Hoon Yang, Daejeon (KR); Seung-Don Choi, Daejeon (KR); Ji-Hoon Jeon, Daejeon (KR); Young-Suk Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/991,677

(22) Filed: Jan. 8, 2016

(65) Prior Publication Data
US 2016/0126526 A1    May 5, 2016

Related U.S. Application Data

(60) Division of application No. 14/012,357, filed on Aug. 28, 2013, now abandoned, which is a continuation of
(Continued)

(30) Foreign Application Priority Data

Jun. 17, 2011  (KR) .................. 10-2011-0059255
Sep. 16, 2011  (KR) .................. 10-2011-0093615
Jun. 15, 2012  (KR) .................. 10-2012-0064368

(51) Int. Cl.
*B23K 1/00* (2006.01)
*H01M 2/26* (2006.01)
(Continued)

(52) U.S. Cl.
CPC ............... *H01M 2/26* (2013.01); *B23K 26/22* (2013.01); *B23K 26/244* (2015.10);
(Continued)

(58) Field of Classification Search
CPC .... B23K 26/22; B23K 26/244; B23K 26/323; B23K 31/02; B23K 35/0233;
(Continued)

(56) References Cited

U.S. PATENT DOCUMENTS 5,373,278 A    12/1994  Saulgeot et al.
5,898,357 A    4/1999   Endo et al.
(Continued)

FOREIGN PATENT DOCUMENTS

EP   1 273 384 A1   1/2003
EP   1 780 819 A1   5/2007
(Continued)

OTHER PUBLICATIONS

Machine translation of JP2001-243866A.*
(Continued)

*Primary Examiner* — Milton I Cano
*Assistant Examiner* — Haixia Zhang
(74) *Attorney, Agent, or Firm* — Morgan, Lewis & Bockius LLP

(57) ABSTRACT

The present invention describes a component for a secondary battery and a manufacturing method thereof, and a secondary battery manufactured by using the component. The component for a secondary battery according to the present invention comprises a lead-free soldering bridge having a melting point of 150 to 300° C. and containing tin (Sn) and copper (Cu) as a main ingredient; the first and second metal plates spaced therebetween through a gap and coupling with the lead-free soldering bridge. According to the present invention, when an over-current flows through
(Continued)

the component for a secondary battery, the temperature of the lead-free soldering bridge is locally increased rapidly to melt the lead-free soldering bridge, thereby efficiently interrupting the flow of an over-current.

11 Claims, 12 Drawing Sheets

Related U.S. Application Data application No. PCT/KR2012/004768, filed on Jun. 15, 2012.

(51) Int. Cl.
| | |
|---|---|
| H01M 2/34 | (2006.01) |
| B23K 35/26 | (2006.01) |
| H01M 2/20 | (2006.01) |
| H01H 85/11 | (2006.01) |
| B23K 35/02 | (2006.01) |
| B23K 26/22 | (2006.01) |
| B23K 31/02 | (2006.01) |
| B23K 26/323 | (2014.01) |
| B23K 26/244 | (2014.01) |
| H01M 10/0525 | (2010.01) |
| B23K 101/34 | (2006.01) |
| B23K 101/38 | (2006.01) |
| B23K 103/08 | (2006.01) |
| B23K 103/10 | (2006.01) |
| B23K 103/12 | (2006.01) |
| B23K 103/18 | (2006.01) |

(52) U.S. Cl.
CPC .............. *B23K 26/323* (2015.10); *B23K 31/02* (2013.01); *B23K 35/0233* (2013.01); *B23K 35/262* (2013.01); *H01H 85/11* (2013.01); *H01M 2/204* (2013.01); *H01M 2/206* (2013.01); *H01M 2/266* (2013.01); *H01M 2/348* (2013.01); *H01M 10/0525* (2013.01); *B23K 1/00* (2013.01); *B23K 2101/34* (2018.08); *B23K 2101/38* (2018.08); *B23K 2103/08* (2018.08); *B23K 2103/10* (2018.08); *B23K 2103/12* (2018.08); *B23K 2103/18* (2018.08); *H01M 2200/101* (2013.01); *H01M 2200/103* (2013.01); *H01M 2220/20* (2013.01); *H01M 2220/30* (2013.01); *Y10T 29/49108* (2015.01)

(58) Field of Classification Search
CPC .............. B23K 35/262; B23K 2201/34; B23K 2201/38; B23K 2203/08; B23K 2203/10; B23K 2203/12; B23K 2203/18; H01H 85/11; H01M 2/206; H01M 2/26; H01M 2/266; H01M 2/348; H01M 2200/101
See application file for complete search history.

(56) References Cited

U.S. PATENT DOCUMENTS

| | | |
|---|---|---|
| 6,767,411 B2 | 7/2004 | Yeh et al. |
| 2002/0015660 A1 | 2/2002 | Murata et al. |
| 2004/0070486 A1 | 4/2004 | Senda et al. |
| 2005/0040926 A1 | 2/2005 | Ely et al. |
| 2006/0044728 A1 | 3/2006 | Kim et al. |
| 2007/0099073 A1 | 5/2007 | White et al. |
| 2012/0107651 A1 | 5/2012 | Hotta et al. |

FOREIGN PATENT DOCUMENTS

| | | |
|---|---|---|
| JP | 11-54005 A | 2/1999 |
| JP | 2001-243866 A | 9/2001 |
| JP | 2002-141051 A | 5/2002 |
| JP | 2007-280898 A | 10/2007 |
| JP | 2008-177084 A | 7/2008 |
| JP | 2008-181822 A | 8/2008 |
| JP | 2012-99307 A | 5/2012 |
| KR | 10-2006-0010659 A | 2/2006 |
| KR | 10-2008-0100980 A | 11/2008 |
| KR | 10-2010-0041505 A | 4/2010 |
| KR | 10-2011-0034489 A | 4/2011 |

OTHER PUBLICATIONS

International Search Report for PCT/KR2012/004768 dated Dec. 6, 2012.
Written Opinion of the International Searching Authority for PCT/KR2012/004768 dated Dec. 6, 2012. (Korean).

* cited by examiner though the lithium ion polymer battery is also divided into two types of batteries depending on the type of the polymer solid electrolyte: an all-solid lithium ion polymer battery containing no electrolyte solution and a lithium ion polymer battery containing an electrolyte solution and using a gel type polymer electrolyte.

Generally, a lithium ion battery using a liquid electrolyte is received in a cylindrical or prismatic metal can-shaped container and hermetically sealed for use. However, since a can-typed secondary battery using a metal can-shaped container is fixed in the shape thereof, electronic products having the can type secondary battery as a power source is limited in design, and has difficulty reducing its volume. Accordingly, a pouch type lithium secondary battery manufactured by receiving an electrode assembly and an electrolyte in a pouch packing made of a film, followed by sealing has been developed and in use.

However, a potential for explosion hazard may exist when a lithium secondary battery overheats, so ensuring the safety of a secondary battery is essential. The overheating of a lithium secondary battery is caused by various factors. One of the factors is the presence of an over-current in a lithium secondary battery. That is, if an over-current flows through a lithium secondary battery, heat is generated by Joule heating, and thus an internal temperature of the battery is quickly increased. Such an increase in temperature causes decomposition reaction of an electrolyte which brings about thermal running, causing the battery to inevitably explode. The over-current occurs when a sharp metal object penetrates a lithium secondary battery, or if an insulator between a cathode plate and an anode plate is destroyed by contraction of a separator being interposed between the cathode and anode plates, or if a rush current is applied to the battery due to an abnormal charge circuit or a load connected to the external.

In order to protect a lithium secondary battery from abnormalities such as an over-current, the battery is generally coupled to a protection circuit before use, and the protection circuit includes a fuse element which irreversibly disconnects a line where a charge or discharge current flows.

FIG. 1 is a circuit diagram showing the deposition structure and the operation mechanism of a fuse element in the configuration of a protection circuit coupled with a lithium secondary battery.

As shown in FIG. 1, the protection circuit includes a fuse element 10 for protecting a battery pack when an over-current occurs, a sense resistor 20 for sensing an over-current, a microcontroller 30 for monitoring the generation of an over-current and operating the fuse element 10 when an over-current occurs, and a switch 40 for switching the inflow of an operation current into the fuse element 10.

The fuse element 10 is installed in a main line connected to the outermost terminal of a cell assembly 20. The main line is a wire in which a charge current or discharge current flows. FIG. 1 shows that the fuse element 10 is installed in a high-voltage line (Pack+).

The fuse element 10 has three terminals, among these, two terminals are in contact with the main line in which a charge or discharge current flows, while the remaining one terminal is in contact with the switch 40. Also, the fuse element 10 includes a fuse 11 serially connected with the main line and melted at a predetermined temperature and a resistor 12 which applies heat to the fuse 11.

The microcontroller 30 monitors whether an over-current occurs or not by periodically detecting the voltage of both ends of the sense resistor 20, and when the occurrence of an over-current is determined, the microcontroller 30 turns on the switch 40. Then, the current which flows in the main line is bypassed to the fuse element 10 and applied to the resistor 12. Thereby, Joule heat generated from the resistor 12 is conducted to the fuse 11 to increase a temperature of the fuse 11, and when the temperature of the fuse 11 reaches the melting temperature, the fuse 11 melts, and thus the main line is irreversibly disconnected. When the main line is disconnected, an over-current no longer flows, thereby overcoming the problems associated with the over-current.

However, there are many problems in the conventional technology described above. That is, if there is a problem with the microcontroller 30, the switch 40 may not turn on even when an over-current occurs. In this case, since a current does not flow into the resistor 12 of the fuse element 10, there is a problem in that the fuse element 10 will not operate. In addition, a space for disposing the fuse element 10 is separately required in the protection circuit, and a program algorithm for controlling the operation of the fuse element 10 has to be loaded in the microcontroller 30. As a result, the space efficiency of the protection circuit deteriorates and the load of the microcontroller 30 increases.

DISCLOSURE

Technical Problem

The present invention is designed to solve the problems of the prior art, and therefore it is an object of the present invention to provide a new type component for a secondary battery to implement a function which manually interrupts an over-current in a secondary battery, separately from the active over-current interrupting function of a protection circuit, and a method of manufacturing the component.

It is another object of the present invention to provide a component for a secondary battery, which may manually interrupt an over-current with a minimum structural change while maintaining an overall shape identical to that of a conventional component, and a method of manufacturing the component.

It is still another object of the present invention to provide a secondary battery and a multi-battery system manufactured by using the component for a secondary battery.

However, the present invention is not limited to the technical problems described above, and those skilled in the art may understand other technical problems from the following description.

Technical Solution

While searching for a way to improve the safety of a lithium secondary battery, the inventors of the present invention found out that when an electrode lead made of metal and having a plate shape was broken into a first metal plate and a second metal plate and these plates were connected by using a plane shaped lead-free soldering material having a melting point of 150° C. to 300° C., safety problems associated with an over-current may be overcome. The inventors of the present invention also confirmed that the electrode lead having the structure described above may be applied to all types of secondary batteries as well as be widely used as a component capable of replacing various kinds of secondary battery components positioned at a current flow path, before completing the present invention.

In order to achieve the above-mentioned objects, in accordance with one aspect of the present invention, there is provided a component for a secondary battery comprising a first metal plate and a second metal plate connected by using a lead-free soldering bridge having a melting point of 150° C. to 300° C. and containing tin (Sn) and copper (Cu) as a main ingredient thereof.

According to an embodiment of the present invention, the first and second metal plates are positioned on substantially the same plane surface, and the lead-free soldering bridge forms a bridge between the first and second metal plates on any one surface or both surfaces of the first and second metal plates.

A portion in which the first and second metal plates are connected to each other with the lead-free soldering bridge is called a melting and separating portion in terms of its function.

Preferably, a minute crack (a gap) is presented between the first and second metal plates. The smaller the width of the gap, the more favorable, so that it is preferably, 1 mm or less, more preferably, 0.5 mm or less, most preferably, 0.3 mm or less, and still most preferably, 0.1 mm or less.

Preferably, at the center of the melting and separating portion, the gap has any one pattern selected from a straight pattern, a zigzag pattern, a saw-toothed pattern, a wave pattern, and a combination thereof.

Preferably, the lead-free soldering bridge forms a bridge between the first and second metal plates through a first coupling portion and a second coupling portion which couple with the first metal plate and the second metal plate, respectively. The first and second coupling portions may be positioned in the same line or different lines depending on the shape of the gap. Preferably, the first and second coupling portions are formed by means of line welding using laser. Alternatively, the first and second coupling portions are formed by means of ultrasound welding, resistance welding, arc welding, or the like.

Preferably, the line welding is performed on the upper surfaces of the first and second metal plates, corresponding to the points where the first and second coupling portions are formed. Therefore, a line welding pattern is made on the surfaces of the first and second metal plates neighboring the gap.

According to another embodiment of the present invention, the first and second metal plates are positioned on substantially the same plane surface, and the lead-free soldering bridge is directly interposed between facing surfaces where the first and second metal plates face each other, which forms a bridge therebetween.

For example, the facing surfaces of the first and second metal plates have tapered slopes toward the lead-free soldering bridge. For another example, the facing surfaces of the first and second metal plates have convex shapes toward the lead-free soldering bridge, and in this configuration, the center areas of the facing surfaces have flat surfaces facing each other in parallel and the periphery areas provided at the upper and lower ends of the center areas have tapered slopes toward opposing direction. For another example, the facing surfaces of the first and second metal plates have a recess structure.

Preferably, regardless of a shape of the facing surfaces, the lead-free soldering bridge and the facing surfaces of the first and second metal plates are coupled by means of laser welding. Alternatively, the lead-free soldering bridge and the facing surfaces of the first and second metal plates are coupled by means of ultrasound welding, resistance welding, arc welding, or the like.

According to another embodiment of the present invention, the first and second metal plates are positioned on substantially the same plane surface, and the lead-free soldering bridge forms a bridge between the first and second metal plates at the area formed by the encounter of first and second bending portions formed at the edges of the first and second metal plates facing each other. Preferably, the first and second bending portions have a bending structure which may be encountered in a plane symmetry or point symmetry.

According to another embodiment of the present invention, the lead-free soldering bridge forms a bridge between the first and second metal plates at the area formed by the edges of the first and second metal plates vertically disposing and overlapping.

According to another embodiment of the present invention, the lead-free soldering bridge forms a bridge between the first and second metal plates at the area formed by the encounter of grooves formed at the facing portions where the first and second metal plates face each other.

In the present invention, the content of tin used as a main ingredient of the lead-free soldering bridge may be 80 to 98 wt % and the content of copper used as an alloy ingredient, may be 2 to 20 wt %.

According to another embodiment of the present invention, the lead-free soldering bridge further comprises at least one additional metal selected from nickel, zinc and silver. The total content of the additional metal is adjusted preferably in the range of 0.01 to 10 wt %.

The component for a secondary battery described above further comprises an insulating tape for covering the melting and separating portion so as to cover the lead-free soldering bridge. Preferably, the insulating tape is comprised of any one group selected from polyolefin film, polypropylene film, acid modified polypropylene, and a combination thereof.

In order to achieve the object described above, in accordance with another aspect of the present invention, there is provided a secondary battery according to the present invention manufactured by using the aforementioned component for a secondary battery as an electrode lead thereof. Accordingly, for a secondary battery according to the present invention, a cathode lead, an anode lead, or both have the structure of the aforementioned component for a secondary battery.

The purpose of the present invention is also achieved by applying a structure of the component for a secondary battery to a connector connecting the adjacent terminals to each other in a multi-battery system having a plurality of secondary batteries connected to each other in series or in parallel.

In order to solve the problems described above, in accordance with still another aspect of the present invention, there is provided a method of manufacturing a component for a secondary battery according to the present invention comprising steps for facing a first metal plate and a second metal plate separated from each other by approaching and positioning on substantially the same plane surface to form a gap between the plates; providing a lead-free soldering bridge having a melting point of 150° C. to 300° C. and containing tin (Sn) and copper (Cu) at the facing portions of the first and second metal plates; and coupling one side of the lead-free soldering bridge with the first metal plate and the other side of the lead-free soldering bridge with the second metal plate.

The method of manufacturing a component for a secondary battery may further comprise a step of covering the lead-free soldering bridge, the gap, or both with an insulating tape.

Advantageous Effects

The component for a secondary battery according to an aspect of the present invention has a structure in which a first metal plate and a second metal plate are minutely spaced from each other through a gap therebetween and connected by means of a lead-free soldering bridge melted at 150° C. to 300° C. Therefore, when an over-current flows through the component for a secondary battery, the temperature of the lead-free soldering bridge rapidly reaches to the melting point described above and the bridge melts to interrupt the flow of an over-current. Also, since the gap formed between the first and second metal plates has a small width, the resistance increase of the component generated by the lead-free soldering bridge is limited to an ignorable level, and substantial changes associated with the overall size and shape are not resulted.

According to another aspect of the present invention, when the component for a secondary battery is used as an electrode lead of a secondary battery, separately from a protection circuit, a secondary battery may irreversibly interrupt an over-current, thereby improving the safety of the secondary battery. In addition, when the component for a secondary battery is used as an electrode lead, no substantial change is made in the size and shape of the electrode lead, so that it is possible to graft an over-current interrupting function onto a secondary battery without a structural modification in design of a secondary battery.

According to another aspect of the present invention, it is advantageous in that the component for a secondary battery may be applied to various kinds of secondary batteries adopting an electrode lead having a plate shape therein.

According to another aspect of the present invention, if the component for a secondary battery is used as a connector used in a multi-battery system having a plurality of secondary battery therein, the connector may have the over-current interrupting function therein.

DESCRIPTION OF DRAWINGS

Other objects and aspects of the present invention will become apparent from the following descriptions of the embodiments with reference to the accompanying drawings in which.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
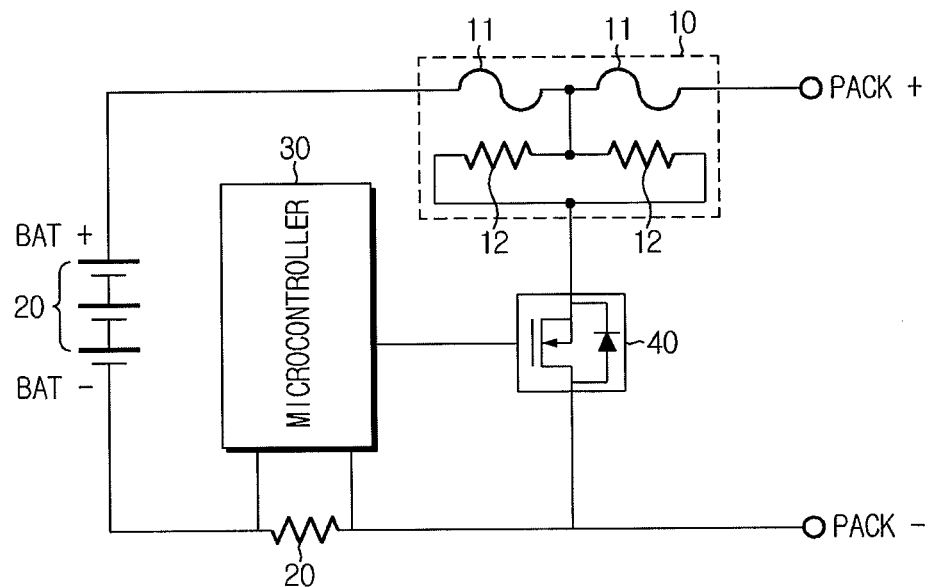
FIG. 1 is a circuit diagram showing the disposition structure and the operation mechanism of a fuse element in the configuration of a protection circuit coupling to a lithium-secondary battery.
Figure 2:
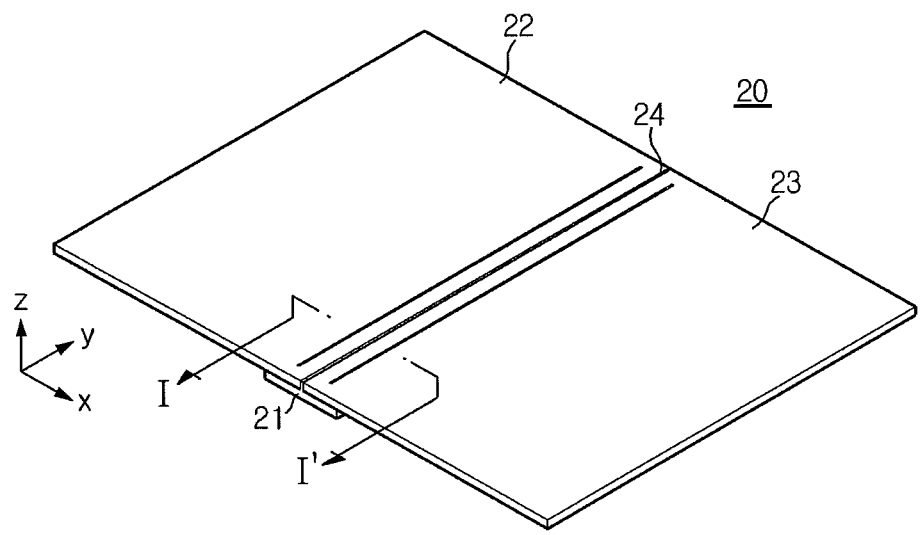
FIG. 2 is a perspective view of a component for a secondary battery according to an embodiment of the present invention.
Figure 3:
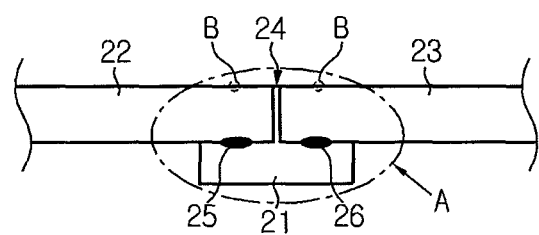
FIG. 3 is a cross-sectional view taken along the line I-I' of FIG. 2.
Figure 4:
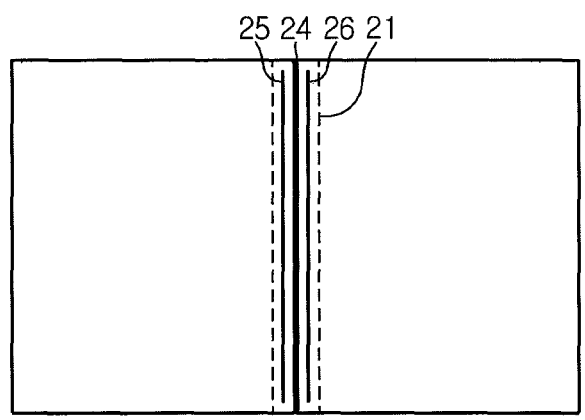
FIG. 4 is a magnified plane view showing a melting and separating portion corresponding to the center area of the component of FIG. 2.

FIG. 2 is a perspective view of a component for a secondary battery according to an embodiment of the present invention, FIG. 3 is a cross-sectional view taken along the line I-I' of FIG. 2, and FIG. 4 is a magnified plane view showing a melting and separating portion corresponding to the center of the component of FIG. 2.

Referring to FIGS. 2 to 4, a component 20 for a secondary battery according to the present invention is configured to have a first metal plate 22 and a second metal plate 23 which are connected with each other by means of a lead-free soldering bridge 21 and spaced from each other through a gap 24.

The gap 24 is a minute crack between the first metal plate 22 and the second metal plate 23. The gap 24 functions as a resistance component which allows most currents flowing through the component 20 to flow from the first metal plate 22 to the second metal plate 23 by means of the lead-free soldering bridge 21. Also, the width of the gap 24 directly associates with the variation of a current flow path through a lead-free soldering bridge 21, and the increase of the width of the gap 24 results in increasing the resistance of the component 20. Accordingly, the smaller the width of the gap 24, the more favorable, so that it is preferably 1 mm or less, more preferably 0.5 mm or less, most preferably 0.3 mm or less, still most preferably 0.1 mm or less.

The first metal plate 22 and the second metal plate 23 are substantially positioned on the surface of a XY plane and consist of a metal or alloy having an electrical resistance of 0.1 mΩ or less. For example, the first metal plate 22 and the second metal plate 23 may be made of a copper substrate, an aluminum substrate or a copper substrate coated with nickel. The first metal plate 22 and the second metal plate 23 are made of the same material, or different materials.

The lead-free soldering bridge 21 has a melting point of 150° C. to 300° C. lower than those of the first metal plate 22 and the second metal plate 23, contains tin (Sn) as a main ingredient and copper (Cu) as an alloy ingredient, and consists of eco-friendly materials, instead of lead (Pb) which is noxious on the environment and the human body.

The melting range of the lead-free soldering bridge 21 is set in consideration of an over-current level intended to interrupt. If a melting point is less than 150° C., the lead-free soldering bridge may melt despite a normal flow. For example, if the component 20 for a secondary battery is used in a secondary battery of electric vehicles, and a melting point is less than 150° C., the lead-free soldering bridge 21 may melt by a rapid charge or discharge current. Also, if a melting point is higher than 300° C., it is difficult to efficiently interrupt an over-current, thereby presenting no advantageous effects of using the component 20 for a secondary battery.

Among the compositions of the lead-free soldering bridge 21, tin affects the melting point and tensile strength characteristics of the bridge 21. In order for the lead-free soldering bridge 21 to have a melting point in the range of 150° C. to 300° C. and also have fine tensile strength characteristics, the content of tin is adjusted to 80 wt % or more, preferably in the range of 85 to 98 wt %. Copper functions to improve the electric conductivity of the component 20 for a secondary battery, so the content of copper is adjusted in the range of 2 to 20 wt %, preferably in the range of 4 to 15 wt %. The wt % which is used herein is a unit based on the total weight of the materials comprised in the lead-free soldering bridge 21 and has the same meaning below.

As mentioned above, by adjusting the contents of tin and copper in a range such as above, not only is the fine tensile strength of the lead-free soldering bridge 21 achieved but also the increase of resistance by the lead-free soldering bridge 21 may be restrained within a low level of a number of %.

In order to have even further improved properties, the lead-free soldering bridge 21 may include a metal having excellent electrical conductivity, such as nickel (Ni), silver (Ag), zinc (Zn) as an additional alloy ingredient, besides tin and copper. The content of the additional alloy ingredient is preferably 0.01 to 10 wt % based on the total material weight.

The lead-free soldering bridge 21 forms a bridge between the first metal plate 22 and the second metal plate 23 on one surface (i.e., lower surface) of the first metal plate 22 and the second metal plate 23.

Here, if the temperature of the lead-free soldering bridge 21 increases to 150° C. to 300° C., the bridge 21 melts into liquid, and the first metal plate 22 and the second metal plate 23 are broken and divided into two separate plates based on a gap 24.

Accordingly, hereinafter, the portion in which the first metal plate 22 and the second metal plate are connected with each other by means of the lead-free soldering bridge 21 is named as a melting and separating portion A.

The melting and separating portion A includes a first coupling portion 25 and a second coupling portion 26. The first coupling portion 25 indicates an area where the lead-free soldering bridge 21 and the first metal plate 22 are coupled with each other, and the second coupling portion 26 indicates an area where the lead-free soldering bridge 21 and the second metal plate 23 are coupled with each other.

The first coupling portion 25 and the second coupling portion 26 are formed by line welding driven toward Y-axis. The first coupling portion 25 is formed at an interface between the first metal plate and the lead-free soldering bridge 21, and the second coupling portion 26 is formed at an interface between the second metal plate 23 and the lead-free soldering bridge 21.

The line welding is performed preferably at the upper portion (see point B) of the first metal plate and the second metal plate 23. Accordingly, line welding patterns are formed on the surfaces of the first metal plate 22 and the second metal plate 23 neighboring a gap 24. The line welding is preferably laser welding, but various welding technologies such as ultrasound welding, resistance welding, arc welding or the like may be applied thereto.

Meanwhile, in order to increase a welding strength, the number of line welding performed may also increase. In this case, coupling portions are additionally formed at the melting and separating portion A, which will be obvious in the art. Also, the first coupling portion 25 and the second coupling portion 26 have continuous or discontinuous line-patterns, but the present invention is not limited thereto.

Figure 5:
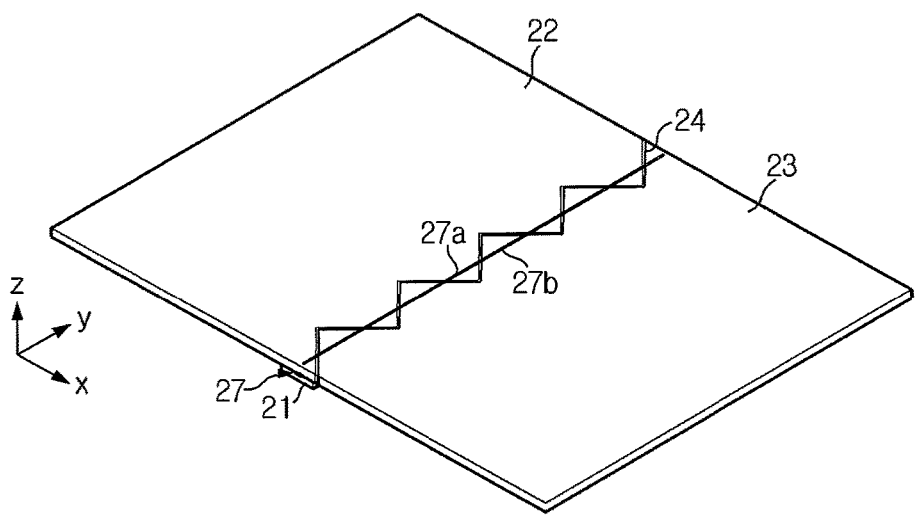
FIGS. 5 and 6 are views showing various patterns of a gap formed in a melting and separating portion.
Figure 6:
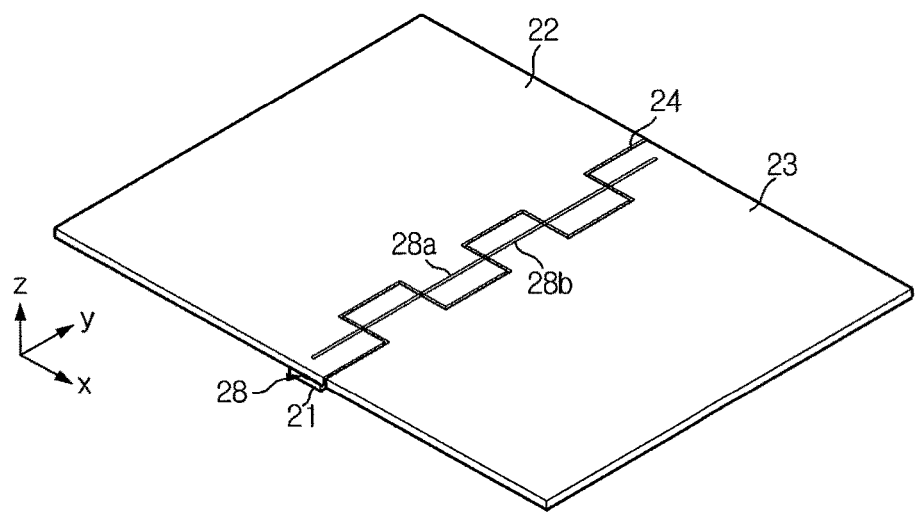

FIGS. 5 and 6 show that a gap 24 between the first metal plate 22 and the second metal plate 23 may be modified to have various shapes.

The gap 24 may have a saw-toothed pattern as shown in FIG. 5. In this case, by performing line welding along the center of a gap 24 toward Y-axis, the lead-free soldering bridge 21 may be coupled with the first metal plate 22 and the second metal plate 23. Line welding is preferably performed at the upper surfaces of the plates and depending on the number of times line welding is performed, coupling portions 27 with at least one line are formed between the lead-free soldering bridge 21 and the first metal plate 22 and between the lead-free soldering bridge and the second metal plate 23. The coupling portions 27 have structural characteristics of which the first coupling portion 27a formed between the lead-free soldering bridge 21 and the first metal plate 22 and the second coupling portion 27b formed between the lead-free soldering bridge 21 and the second metal plate 23 are positioned on the same line by turns.

In addition, as shown in FIG. 6, the gap 24 may have a shape of square convex patterns engaged by turns. In this case, depending on the number of times line welding is performed, coupling portions 28 with at least one line are formed between the lead-free soldering bridge 21 and the first metal plate 22 and between the lead-free soldering bridge 21 and the second metal plate 23. In addition, the coupling portions 28 have structural characteristics of which the first coupling portion 28a formed between the lead-free soldering bridge 21 and the first metal plate 22 and the second coupling portion 28b formed between the lead-free soldering bridge 21 and the second metal plate 23 are positioned on the same line by turns.

Meanwhile, the gap 24 may have various patterns beside the patterns shown in FIGS. 5 and 6. Also, the gap 24 may have a pattern which combines the patterns described above, instead of having a single pattern.

FIGS. 7 to 14 are cross-sectional views showing various modified structures of which a component 20 for a secondary battery may have. In FIGS. 7 to 14, the arrows are the points where line welding is performed. The detailed explanation with respect to welding will be omitted herein.

Figure 7:
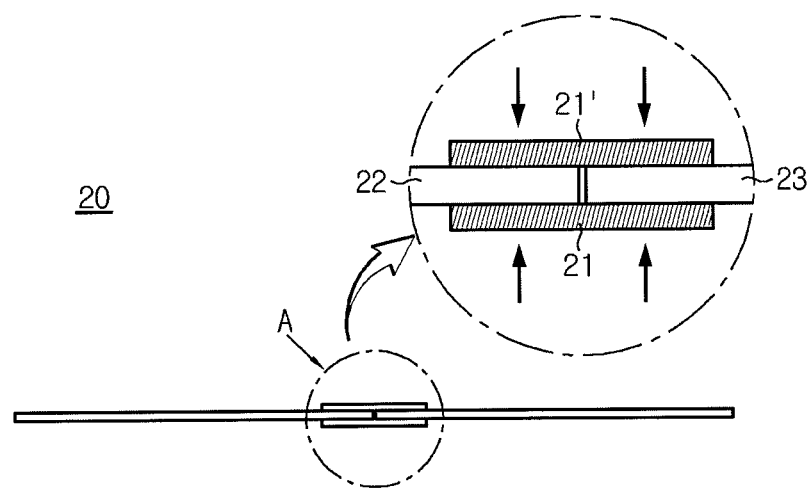
FIGS. 7 to 14 are cross-sectional views showing a component for a secondary battery according to another embodiment of the present invention.

Referring to FIG. 7, an additional lead-free soldering bridge 21' may be formed on the upper surface of a melting and separating portion A. The lead-free soldering bridge 21' is made of the same material as the lower lead-free soldering bridge 21, and coupled with the first and second metal plates 22, 23 by the same welding technology.

Figure 8A:
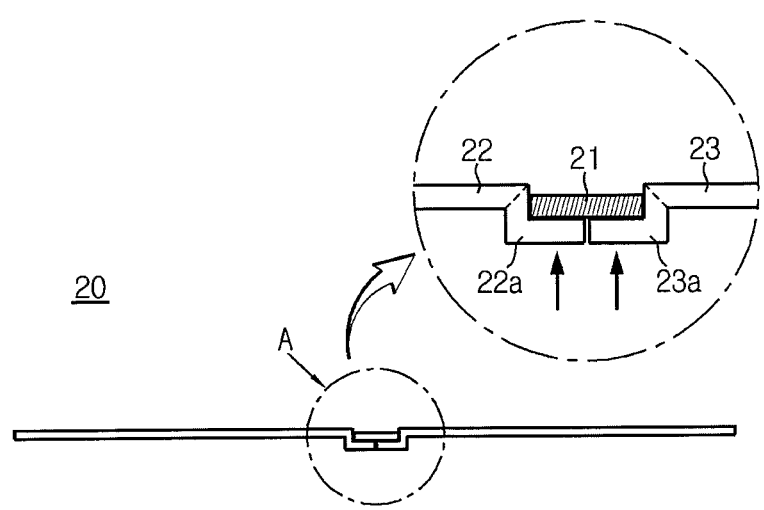

Referring to FIG. 8a, the lead-free soldering bridge 21 may form a bridge between the first metal plate 22 and the second metal plate 23 at the area formed by the encounter of a first bending portion 22a and a second bending portion 23a formed at each end where the first metal plate 22 and the second metal plate 23 face each other.

Figure 8B:
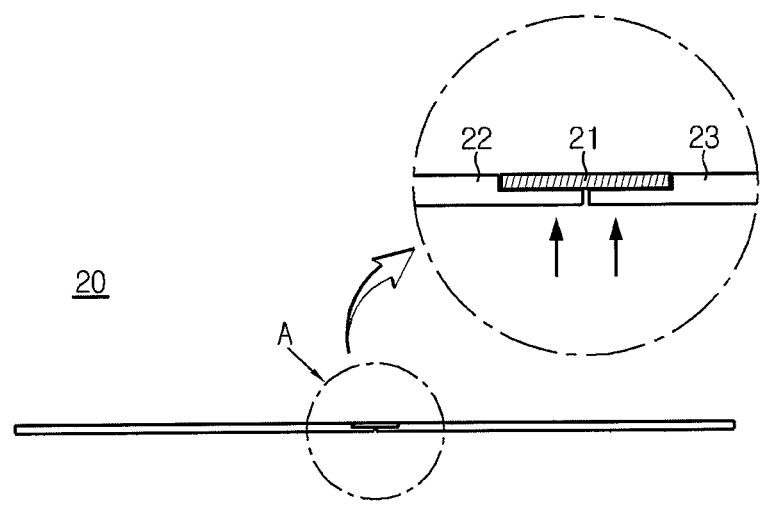

Referring to FIG. 8b, the lead-free soldering bridge 21 may form a bridge between the first metal plate 22 and the second metal plate 23 at the area formed by the encounter of grooves formed at each end where the first metal plate 22 and the second metal plate 23 face each other.

Regarding the modified structure of FIG. 8b, the lead-free soldering bridge 21 may be formed by means of the following process, instead of welding.

That is, first, one piece of a metal plate is prepared and a line-shaped groove, at which a lead-free soldering bridge 21 is formed, is formed on the upper surface of the metal plate.

The line-shaped groove may be formed by using any one technology selected from a physical or chemical etching technology, a mechanical cutting technology using a saw blade or the like, a local scratching technology using a high hardness knife such as a diamond, an etching technology using an electron beam, and a skiving technology.

After the line-shaped groove is formed, soldering materials for forming a lead-free soldering bridge 21 are disposed at the place where the groove is formed. For the soldering materials, a soldering wire which has a cross-sectional structure identical or similar to that of the lead-free soldering bridge may be used. Alternatively, as a soldering material, a soldering paste in which minute soldering powders are dispersed may be used.

The contents of tin, copper and additional metal contained in the soldering materials are determined in consideration of a melting temperature range allowed to a lead-free soldering bridge 21 which will be formed in the groove, an over-current level intended to interrupt by using a component for a secondary battery, and electrical or mechanical properties intended to assign to a component for a secondary battery.

When the soldering materials are disposed, a rolling process proceeds at least at the place where the soldering materials are disposed by applying pressures with a jig, a roller or the like. Thermal energy capable of causing a local melting is applied to the place where the soldering materials are in contact with the inner surface of the groove. Then, an alloy is formed from each of metal constituents comprised in the metal plate and the soldering materials along the contact interface. Like this, when an alloy is formed from different metal constituents, the surface resistance formed in the interface between the soldering materials and the metal plate may be minimized.

The thermal energy may be applied by using various methods such as a thermal conductivity method, an ultrasound vibration method, an electric energy beam radiation method, an electromagnetic inducing method, or the like. However, the present invention is not limited to a specific method for applying thermal energy, and may use various known methods in the art, which can generate thermal energy at the portion to which pressures are applied while a rolling process proceeds.

After completing the rolling process, a lead-free soldering bridge 21 is formed in the groove, a gap is formed at the lower portion of the lead-free soldering bridge 21 to separate the first metal plate 22 and the second metal plate 23 from the metal plate. The gap may be formed by using any one technology for forming the groove as described above.

After forming the gap, the residues of the soldering materials attached to the first metal plate and the second metal plate 23 are removed, to complete the manufacturing of the component for a secondary battery.

Figure 9:
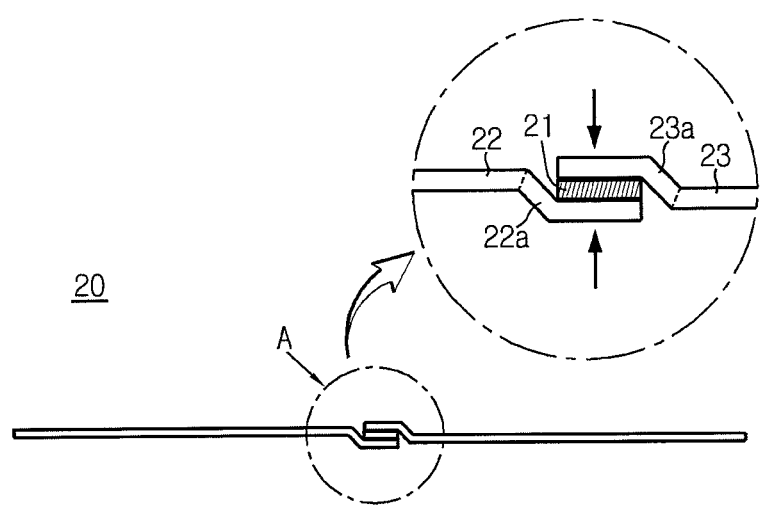

Meanwhile, in the modified structure of FIG. 8, the first bending portion 22a and the second bending portion 23a are in a plane symmetry. However, as shown in FIG. 9, the first bending portion 22a and the second bending portion 23a may be in a point symmetry. Also, it is possible to omit a bending structure in FIG. 9. That is, the lead-free soldering bridge 21 may be formed in a space generated when the ends of the first metal plate 22 and the second metal plate 23 are vertically overlapped to have a predetermined width.

Figure 10:
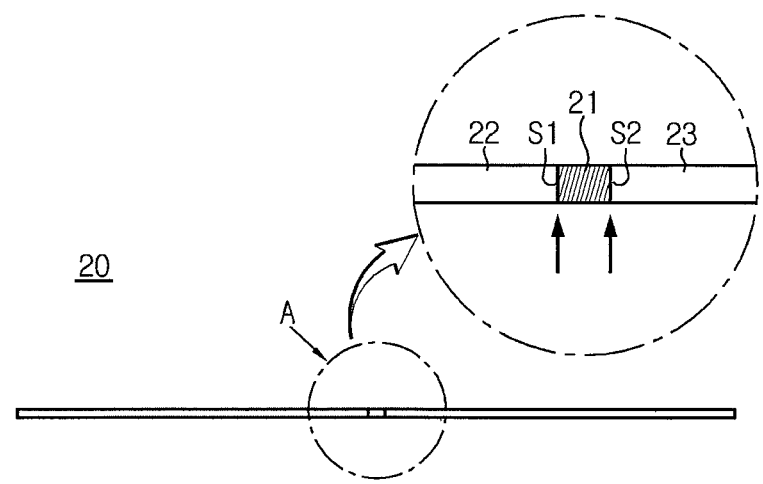

Referring to FIG. 10, by performing welding at the points marked with arrows, the lead-free soldering bridge 21 may be directly coupled with facing surfaces (S1, S2) of the first metal plate 22 and the second metal plate 23. To achieve this, it is preferred to minimize the width of the lead-free soldering bridge 21.

Meanwhile, in order to enlarge the size of coupling areas between the lead-free soldering bridge and the first and second metal plates 22, 23 and improve the tensile strength characteristic thereof, the facing surfaces S1, S2 are likely to be modified in various shapes.

Figure 11:
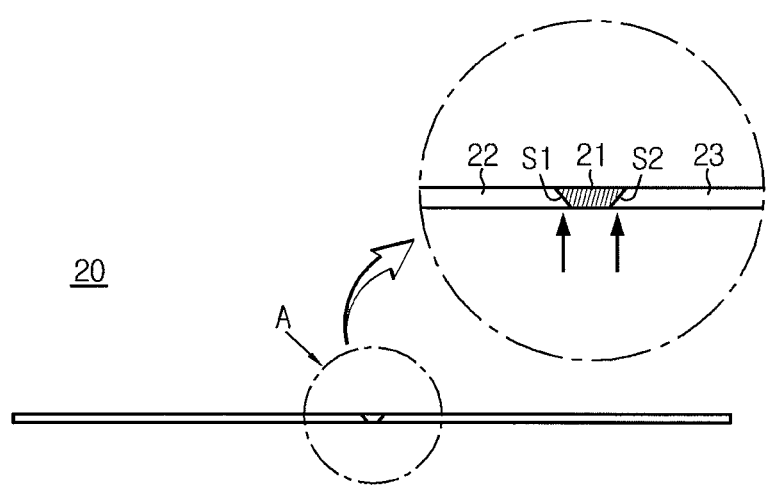
Figure 12:
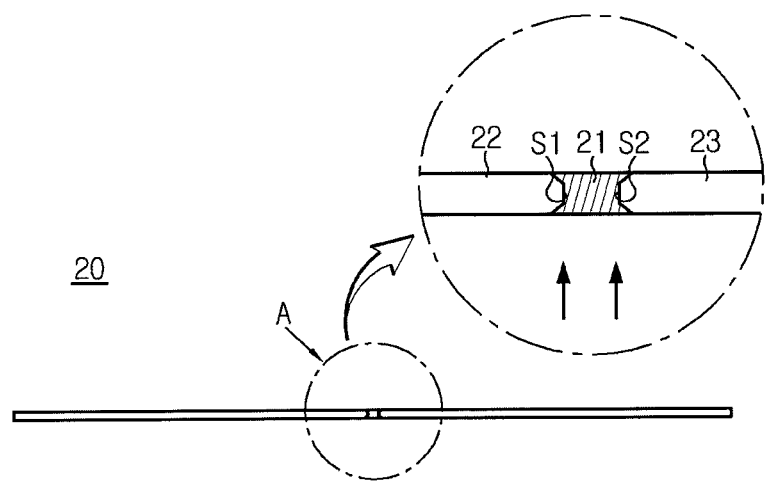
Figure 13:
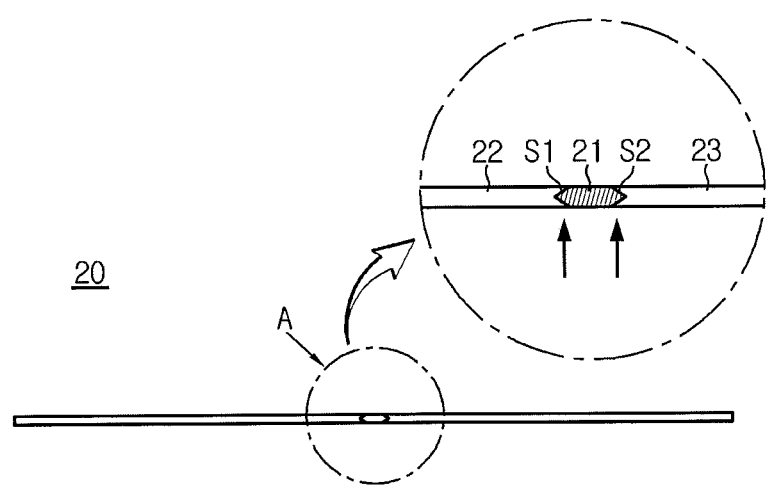
Figure 14:
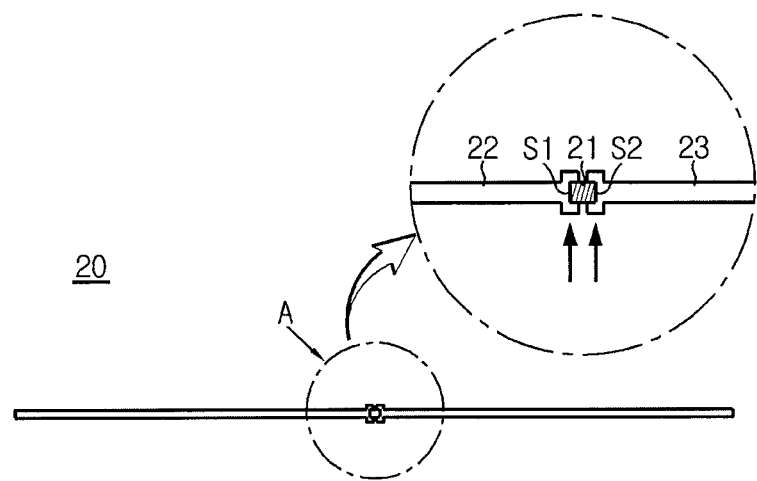

For example, as shown in FIG. 11, each of the facing surfaces S1, S2 may have tapered slopes toward the lead-free soldering bridge 21. For another example, as shown in FIG. 12, in order to have convex shapes toward the lead-free soldering bridge 21, the center of facing surfaces S1, S2 may have flat surfaces in parallel and the periphery areas provided at the upper and lower ends of the center areas have tapered slopes toward opposing direction. For another example, as shown in FIG. 13, the facing surfaces S1, S2 have a recess structure in trench (ditch) shape. The recess may have various shapes such as a wedge shape, a square shape, a semicircle shape, or the like. For another example, as shown in FIG. 14, the recess structure may have a side wall which juts out to the upper and lower portions of the plates.

Figure 15:
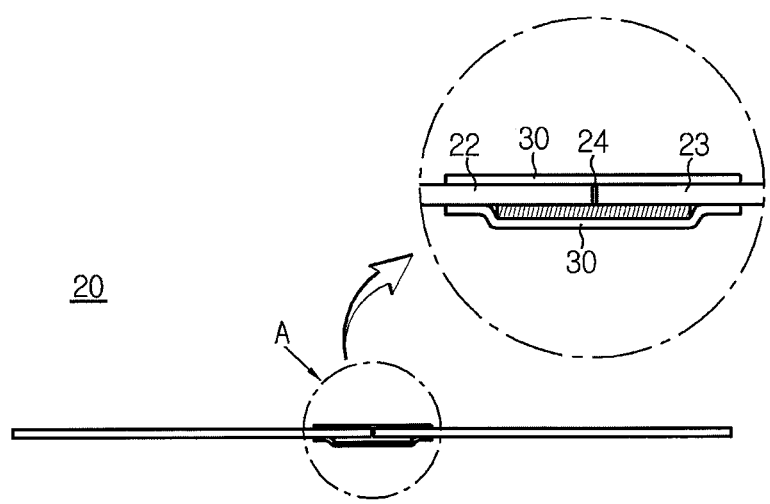
FIG. 15 is a cross-sectional view showing a component for a secondary battery covered with an insulating tape according to another embodiment of the present invention.

Referring to FIG. 15, in order to protect the melting and separating portion A from the air, the melting and separating portion A may be covered with an insulating tape 30. Unlike FIG. 15, the insulating tape 30 may cover only one portion of the melting and separating portion A, instead of covering both of the upper and lower portions thereof. The insulating tape 30 may be applied to all kinds of components for a secondary battery described in the present disclosure. The insulating tape 30 may be any one selected from polyolefin film, polypropylene film and acid modified polypropylene, and combination thereof, but the present invention is not limited thereto.

Figure 16:
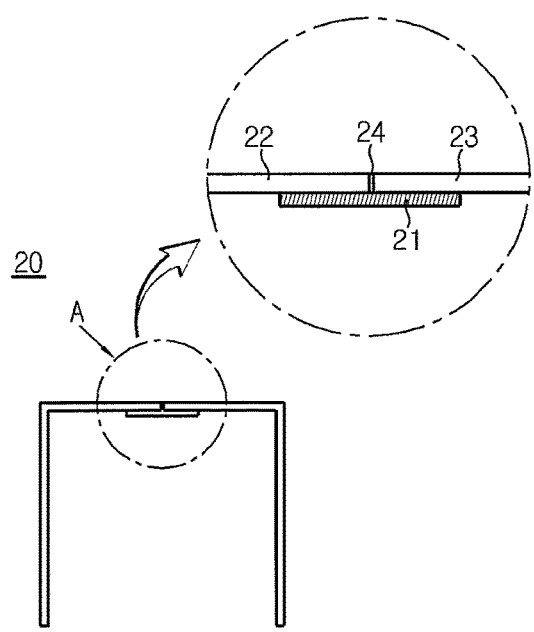
FIG. 16 is a cross-sectional view showing a component for a secondary battery having a bending structure according to an embodiment of the present invention.

Referring to FIG. 16, depending on the need of the component 20 for a secondary battery for use, the component 20 for a secondary battery according to the present invention may be modified to have various shapes by bending the middle part of the first metal plate 22 or the second metal plate 23.

A method of manufacturing the component for a secondary battery according to the present invention is obvious to understand based on the aforementioned embodiment. First, the first and second metal plates are prepared to perfectly fit on the structure of the components shown in the drawings. The first metal plate and the second metal plate are neighbored on the same plane and faced each other to form a gap therebetween. There are various structures of the portion where the first metal plate and the second metal plate face each other as shown in the drawings. Then, a lead-free soldering bridge having a melting point of 150° C. to 300° C. and containing tin (Sn) and copper (Cu) is provided at the facing portions of the first metal plate and the second metal plate. Then, one side of the lead-free soldering bridge is welded to the first metal plate and the other side thereof is welded to the second metal plate. Although it is not essential, an additional step for attaching an insulating tape to block the lead-free soldering bridge or a gap from the air may proceed.

The component for a secondary battery according to the present invention may be used in various ways for manufacturing a secondary battery.

Figure 17:
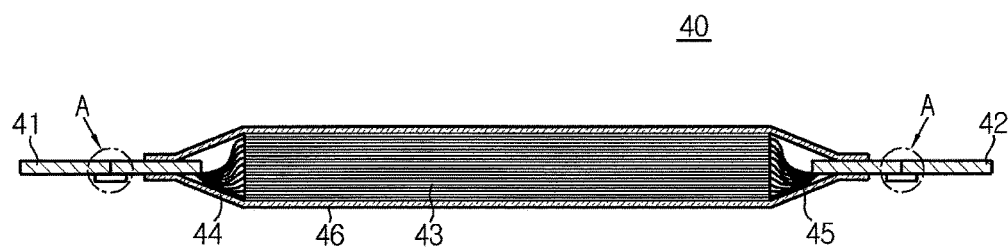
FIG. 17 is a cross-sectional view showing a secondary battery according to an embodiment of the present invention.

FIG. 17 is a cross-sectional view showing a pouch type secondary battery according to an embodiment of the present invention, where the secondary battery is manufactured by using the component for a secondary battery described above.

Referring to FIG. 17, the secondary battery 40 according to the present invention includes an electrode assembly 43 in which a cathode lead 41 and an anode lead 42 are electrically connected to each other.

The cathode lead 41 and the anode lead 42 have a structure substantially identical to the component for a secondary battery according to the present invention. That is, the cathode lead 41 and the anode lead 42 have a structure in which two metal plates are connected to each other by using a melting and separating portion A in a bridge form. Unlike FIG. 17, the structure of the component for a secondary battery according to the present invention may be applied to either the cathode lead 41 or the anode lead 42.

The electrode assembly 43 has a structure in which at least one or more unit cells are aggregated and the unit cells have separation membranes between a cathode and an anode. At least one side of the cathode and the anode is coated with active materials required for operating a secondary battery, and an insulating membrane which breaks electrical connections between unit cells may be interposed in the adjacent unit cells. For example, the cathode and anode may be coated with a lithium-based cathode active material and a carbon-based anode active material, respectively. The separating membrane and the insulating membrane may comprise a polyolefin-based porous polymer film. Such a secondary battery structure described above is widely known in the art and the present invention is not limited to the specific structure and the material composition of an electrode assembly 43.

The electrode assembly 43 includes a plurality of cathode taps 44 and anode taps 45 elongated from each of a cathode and an anode. The plurality of cathode taps 44 and anode taps 45 are collected as a whole by a first welding and then coupled with each of the cathode lead 41 and anode lead 42 after a second welding.

The electrode assembly 43 is tightly sealed in a packing 46 to externally expose the ends of the cathode lead 41 and anode lead 42. The packing 46 comprises aluminum pouch films in which a thermal adhesive layer is formed at its inside toward the electrode assembly 43. Accordingly, the electrode assembly 43 is sealed in a packing 46 by applying heat along the edges of the packing 46. Depending on the type of a secondary battery, the packing 46 may include a liquid electrolyte, a solid electrolyte, a gel-typed electrolyte, or the like.

Since the secondary battery 40 according to the present invention includes a melting and separating portion A in electrode leads, when an over-current flows through the electrode leads and the temperature of the lead-free soldering bridge included in a melting and separating portion A increases until 150° C. to 300° C., the breakage of the electrode leads is resulted from the center of the melting and separating portion A to irreversibly interrupt the over-current flow. Therefore, independently of a protection circuit, a secondary battery may be protected from an over-current.

The component 20 for a secondary battery according to the present invention may be used as a connector component for connecting a plurality of secondary batteries in series or in parallel, instead of using an electrode lead of a secondary battery.

Figure 18:
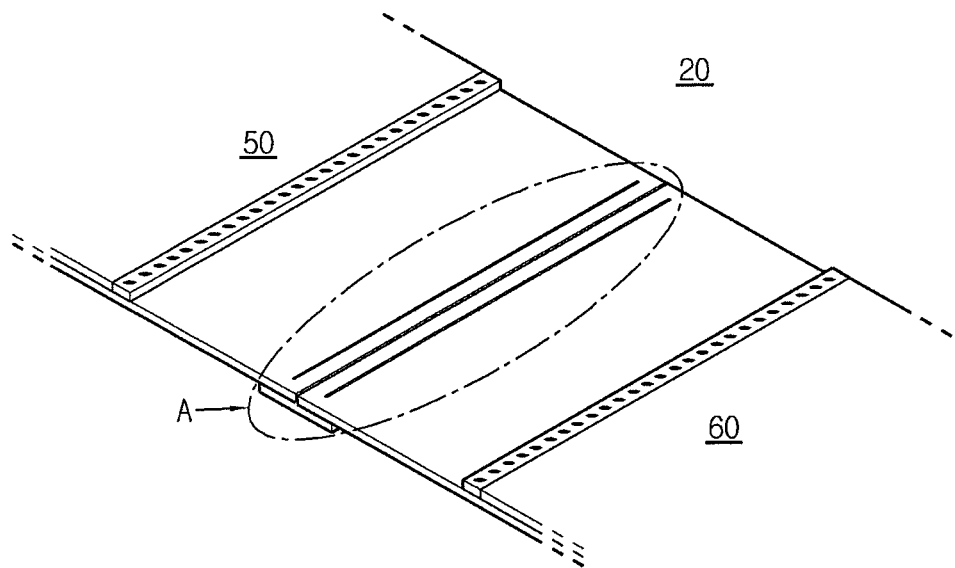
FIGS. 18 and 19 are views partially showing connector connection portions of a multi-battery system according to an embodiment of the present invention.
Figure 19:
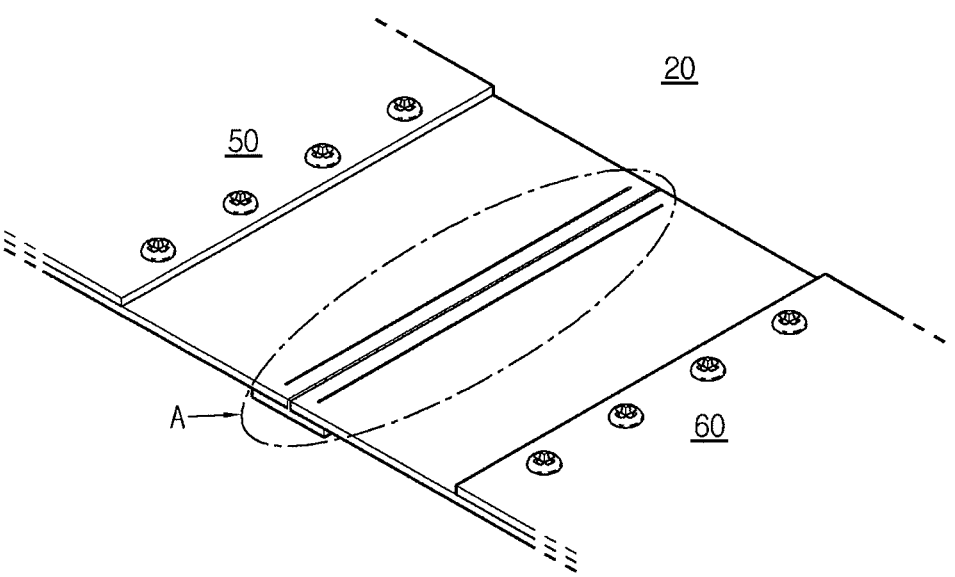

FIGS. 18 and 19 are views illustrating embodiments in which the component 20 for a secondary battery according to the present invention is used as a connector component.

As shown in FIG. 18, the component 20 for a secondary battery according to the present invention may be connected to its adjacent terminals 50, 60 by welding. Also, as shown in FIG. 19, the component 20 for a secondary battery according to the present invention may be connected to its adjacent terminals 50, 60 by using a bolt. Although not shown in FIGS. 18 and 19, the component 20 for a secondary battery may be connected to terminals 50, 60 by using rivets. The terminals 50, 60 indicate a terminal provided in a component required for electronic connecting in a large-capacity multi-battery system having a plurality of secondary batteries aggregated therein and there is no specific limitation for a terminal type. Also, the component 20 for a secondary battery according to the present invention and the terminals 50, 60 may be connected by using various modified methods instead of the method described above, as being obvious in the art.

The multi-battery system means a battery module in which a plurality of secondary batteries is connected to each other in series or in parallel; a battery pack in which a plurality of battery modules is connected to each other in series or in parallel; a pack assembly in which a plurality of battery packs are connected to each other in series or in parallel; or the like.

As mentioned above, when the component 20 for a secondary battery is interposed in the adjacent terminals 50, 60 and an over-current flows between the terminals 50, 60 to increase the temperature of the lead-free soldering bridge included in the component 20 for a secondary battery until 150° C. to 300° C., the electric connection between the terminals 50, 60 is broken mainly from the separating melting portion A to irreversibly interrupt the over-current flow. Therefore, independently of a protection circuit, a multi-battery system may be protected from an over-current.

The multi-battery system may be used as a large-capacity secondary battery system used for power tools; vehicles powered by electricity including electric vehicles (EV), hybrid vehicles (HEV), and plug-in hybrid electric vehicles (PHEV); electric trucks; or power storage apparatuses.

Hereinafter, the present invention is explained in more detail using the Embodiments. However, the following Embodiments may be modified in various ways, and the present invention should not be interpreted as being limited thereto.

EXAMPLE 1

A pouch type lithium secondary battery having a capacity of 45 Ah was manufactured and the structure of the component for a secondary battery of FIG. 2 was applied only to an anode lead. Therefore, the anode lead had a structure in which two copper plates were coupled with a lead-free soldering bridge by means of line welding. The thickness of the copper plates and the lead-free soldering bridge were 0.2 mm and 0.5 mm, respectively. The line welding was carried out by using a laser under the energy condition in which 3.5 kV is applied. The distance between the points where the line welding was carried was 1 mm. The lead-free soldering bridge was formed with a soldering alloy substrate containing 96 wt % of tin and 4 wt % of copper, and having a width of 3 mm.

EXAMPLE 2

The procedure of Example 1 was repeated, except that an alloy substrate containing 99.4 wt % of tin, 0.5 wt % of copper and 0.1 wt % of nickel was used for forming a lead-free soldering bridge, to fabricate a pouch type lithium secondary battery having a capacity of 45 Ah.

COMPARATIVE EXAMPLE

The procedure of Example 1 was repeated, except that an anode lead having no lead-free soldering bridge and made of copper plates having a thickness of 0.2 mm was used, to fabricate a pouch type lithium secondary battery having a capacity of 45 Ah.

EXPERIMENTAL EXAMPLE 1

Resistance Measurement Test of Lithium Secondary Battery

The lithium secondary battery of Example 1 was charged and discharged at 25° C. under an atmospheric pressure, in which the levels of a charge current and a discharge current were set at 72 A and 95 A, respectively. When the lithium secondary battery was charged, the resistance of the secondary battery was measured whenever State of Charge (SOC) increased by %, and thus, an average resistance value of 1.515 mOhm was obtained.

Similarly, the resistance of the lithium secondary battery of Example 2 was measured, and thus, an average resistance value of 1.529 mOhm was obtained.

In addition, the resistance of the lithium secondary battery of Comparative Example was measured, and thus, an average resistance value of 1.494 mOhm was obtained.

According to the results of such a test, the lithium secondary battery of Example 1 exhibited resistance characteristic increased by 1.4% as compared with Comparative Example and the lithium secondary battery of Example 2 exhibited resistance characteristic increased by 2.3% as compared with Comparative Example. Therefore, it is understood that even though the structure of the component for a secondary battery according to the present invention is applied to an anode lead, a resistance level thereof is not significantly changed compared to that of a conventional lithium secondary battery.

In addition, in Example 2, considering that the extremely low content of copper was 0.5 wt %, it is obvious that if the content of cooper comprised in a lead-free soldering bridge is adjusted in the range of 2 to 20 wt %, the resistance characteristic will just increase at least in a level of less than 2.3%.

EXPERIMENTAL EXAMPLE 2

Short-Circuit Test of Lithium Secondary Battery

In order to test the safety of a lithium secondary battery using the component for a secondary battery according to the present invention as an electrode lead, a short-circuit test was performed under an over-current circumstance.

The lithium secondary batteries of Examples 1 and 2 were fully charged to be SOC 100%, and the cathode lead and the anode lead thereof were connected to each other to form a short-circuit condition. After forming the short-circuit condition, a short-circuit current level was measured at a predetermined time interval, and a temperature change over time of the anode lead plate and the center portion of the secondary battery packing were observed over time. The monitoring results with respect to short-circuit current and temperature are shown in FIGS. 20 and 21.

Figure 20:
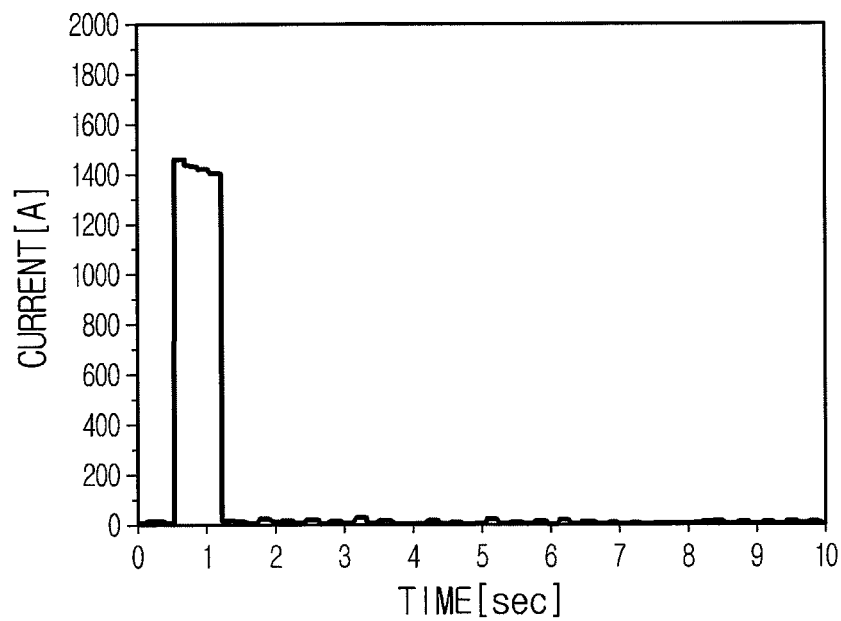
FIG. 20 is a graph showing current measuring values over time, obtained from a short-circuit test according to the present invention.

As shown in FIG. 20, the short-circuit current level of both lithium secondary batteries of Examples 1 and 2 rapidly increased to 1465 A after the short-circuit condition was formed, a breakage was generated in the anode lead within one second after a short-circuit current started to flow, and thus the short-circuit current decreased to zero. The breakage in the anode lead means that the temperature of the lead-free soldering bridge comprised in the anode lead was rapidly raised until the melting point thereof.

Figure 21:
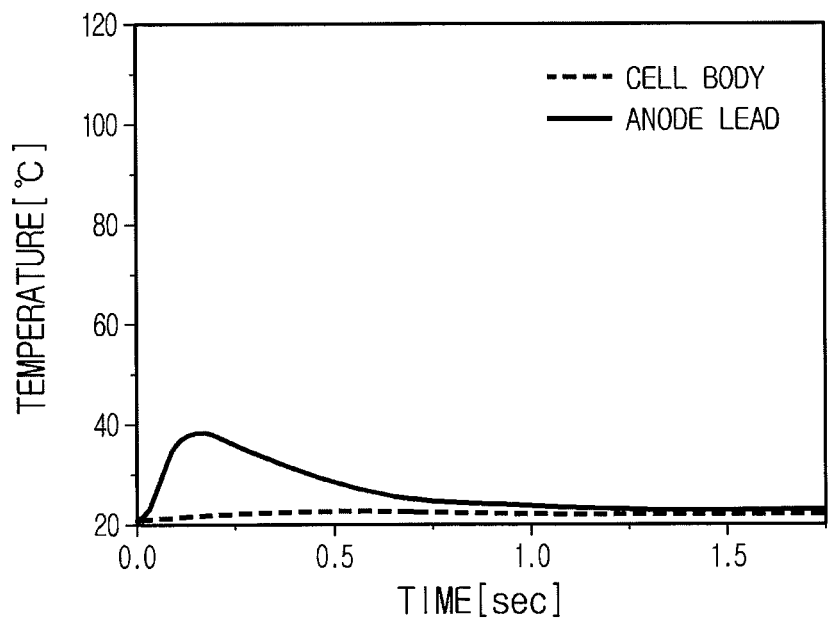
FIG. 21 is a graph showing temperature measuring values over time, obtained from a short-circuit test according to the present invention.

In addition, as shown in FIG. 21, it was confirmed that even though both lithium secondary batteries of Examples 1 and 2 had rapidly increased in their short-circuit current, the temperature of the secondary batteries did not substantially change and the temperature of the electrode leads increased to about 18° C. after an over-current occurred and then returned to room temperature within one minute.

A short-circuit test was identically performed with respect to the battery module of the Comparative Example. Based on the test results, it was confirmed that the temperature of the lithium secondary battery rapidly increased to 100° C. or higher within two minutes, and the sealing portion of the lithium secondary battery was opened to emit gas. After gas emission, the temperature of the lithium secondary battery was maintained to approximately 60° C.

Based on the results of such test for the lithium secondary batteries of Examples 1 and 2, it can be understood that as soon as a short-circuit current occurred, an over-current was interrupted by the breakage of the electrode leads, and a temperature locally increased from 150° C. to 300° C. only at the breakage portion of the electrode leads in which the lead-free soldering bridge melted, so that the generation of an over-current does not substantially affect the secondary batteries.

Therefore, it is confirmed that if a structure of the component for a secondary battery according to the present invention is applied to electrode leads of a lithium secondary battery, the safety of the lithium secondary battery can be improved under an over-current circumstance.

EXPERIMENTAL EXAMPLE 3

Overcharging Test of Secondary Battery

In order to evaluate the safety of a secondary battery under the overcharge condition in which a structure of the component for a secondary battery according to the present invention is applied to electrode leads of a lithium secondary battery, the following experiment was carried out.

Lithium secondary batteries fabricated in Examples 1 and 2 and Comparative Example were used, and each secondary battery was overcharged under the condition of 10V/1 A and the monitoring results are shown in the following Table 1.

TABLE 1

|  | Ignition | Explosion | Smoke |
|---|---|---|---|
| Example 1 | X | X | X |
| Example 2 | X | X | X |
| Comparative Example | ○ | ○ | ○ |

According to the results of the test, when the secondary battery of Comparative Example was overcharged, the temperature of the battery dramatically increased, thereby resulting in the ignition and explosion of the battery. However, the electrode leads comprised in the lithium secondary batteries of Examples of the present invention were broken by the rapidly increased temperature, thereby ensuring their safety. Accordingly, it can be understood that when the structure of the component for a secondary battery according to the present invention is applied to an electrode lead comprised in a lithium secondary battery, the safety of a secondary battery can be improved under an overcharge circumstance as well as the over-current circumstance.

EXPERIMENTAL EXAMPLE 4

Evaluation Test of Tensile Strength Characteristics of Secondary Battery Components In order to evaluate the tensile strength characteristics of the component for a secondary battery according to an embodiment of the present invention, the following test was performed.

First, weld strength between the soldering material used as a lead-free soldering bridge comprised in the component for a secondary battery according to the present invention and a metal plate was measured.

Sample 1

A copper substrate with a width of 1 cm, a length of 4 cm, and a thickness of 0.5 mm, and a soldering alloy substrate comprising an alloy with a width of 1 cm, a length of 4 cm, and a thickness of 0.5 mm and having 96 weight % of tin and 4 weight % of copper were overlapped in 3 mm, and then line welding was performed with laser along the center of the overlapped portion, to fabricate Sample 1.

Sample 2

A copper substrate with a width of 1 cm, a length of 4 cm, and a thickness of 0.5 mm, and an aluminum substrate with a width of 1 cm, a length of 4 cm, and a thickness of 0.2 mm were overlapped in 3 mm, and then, line welding was performed with laser along the center of the overlapped portion, like Sample 1, to fabricate Sample 2.

After Samples 1 and 2 were prepared, the tensile strength of each sample was measured by means of Universal Testing Machine (UTM). As a result, the tensile strength of Sample 1 was 233.2 N, and the tensile strength of Sample 2 was 150.9 N, and it was recognized that Sample 1 has approximately 54.5% higher tensile strength than that of Sample 2. Accordingly, it was confirmed that the lead-free soldering material used in the component for a secondary battery according to the present invention has excellent weld characteristic with a metal plate. Meanwhile, the tensile strength level of Sample 2 is larger than the level required for various kinds of connecters used in an electrode lead of a secondary battery or a multi-battery system. Accordingly, it can be understood that a lead-free soldering bridge according to the present invention can substitute various kinds of connectors used in an electrode lead of a secondary battery or a multi-battery system.

Next, for the soldering connector including tin and copper, the change of tensile strength characteristics was evaluated depending on the change of copper content. To achieve this, six samples in which cooper content was adjusted to 4 w %, 6 w %, 8 w %, 10 w %, 15 w % and 20 wt %, respectively, were prepared and named Samples 3 to 8.

The Samples 3 to 8 were prepared to have the same thickness, width, and length, that is, a thickness of 0.5 mm, a width of 1 cm and a length of 5 cm, and the tensile strength of each sample was measured by means of UTM. The measuring results were shown in FIG. 22.

Figure 22:
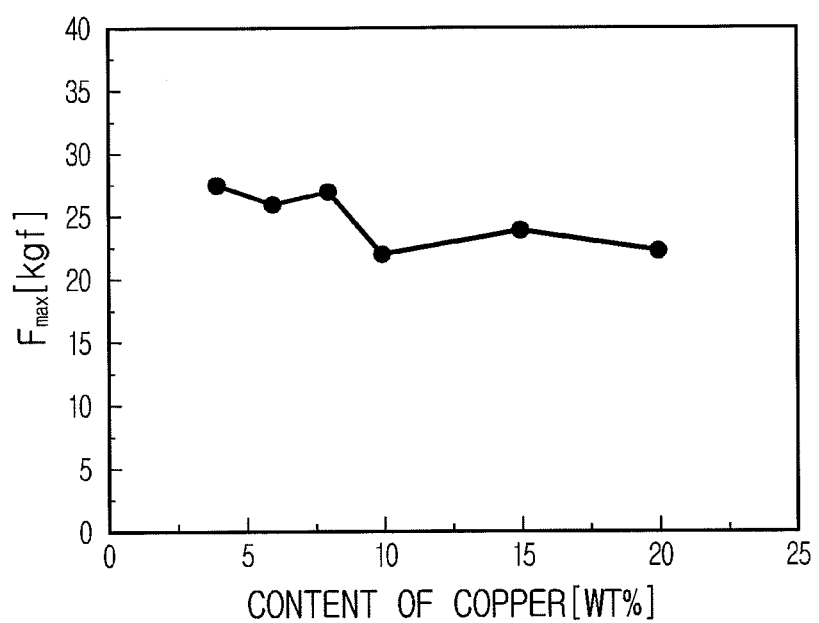
FIG. 22 is a graph showing tensile strength characteristics depending on a copper content, obtained from a tensile strength evaluation test according to the present invention.

As shown in FIG. 22, it was recognized that the lead-free soldering material having copper in a content of 4 to 8 wt % exhibited the highest tensile strength. However, through the tensile strength measurement test of Samples 1 and 2, it was confirmed that the lead-free soldering material having 4 wt % of copper content had excellent weld characteristic with the metal plate. Accordingly, it is obvious that the lead-free soldering material having 4 to 8 wt % of copper content also has excellent weld characteristic with the metal plate. Also, if the content of copper is less than 4 wt %, the content of tin having a good tensile strength characteristic relatively increases. Therefore, even without a direct measurement, it is obvious that the tensile strength level of a case in which the content of copper is less than 4 wt % is similar to that of the case in which the content of copper is from 4 to 8 wt %.

Meanwhile, it was confirmed that if the content of copper increases by 10 to 20 wt %, a tensile strength decreases a little compared to the case in which the content of copper is in the range of 4 to 8 wt %. However, since the decrease of a tensile strength is subtle, even a lead-free soldering material having a copper content of 10 to 20 wt % has enough tensile strength capable of applying to the component for a secondary battery according to the present invention, as being obvious in the art.

Based on the test result described above, it can be understood that the lead-free soldering material used to implement the structure of the component for a secondary battery according to the present invention has enough tensile strength capable of using as various kinds of connectors used for an electrode lead of a secondary battery or a multi-battery system.

Accordingly, without modifying geometrical specifications of a conventional electrode lead or connectors, a component for a secondary battery according to the present invention may be used as a substitute for the electrode lead or connectors.

INDUSTRIAL APPLICABILITY

The present invention has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A component for a secondary battery comprising:
   a lead-free soldering bridge having a melting point of 150° C. to 300° C. and containing tin (Sn), copper (Cu), and an additional metal; and
   a first metal plate and a second metal plate spaced from each other with a minute gap between side edges of the first metal plate and the second metal plate and coupled with the lead-free soldering bridge,
   wherein the content of copper is in the range of 4 to 8 wt%,
   wherein the content of the additional metal is 0.01 to 10 wt%,
   wherein the lead-free soldering bridge is coupled with the first and second metal plates at an area formed by an encounter of grooves formed at edges of top surfaces of the first and second metal plates,
   wherein a top surface of the lead-free soldering bridge is coplanar with the top surfaces of the first and second metal plates.

2. The component for a secondary battery according to claim 1, wherein the first metal plate and the second metal plate are positioned on the same plane.

3. The component for a secondary battery according to claim 1, wherein the gap has a width of 0.3 mm or less.

4. The component for a secondary battery according to claim 1, wherein the gap has any one pattern selected from a straight pattern, a zigzag pattern, a saw-toothed pattern, a wave pattern, and a combination thereof.

5. The component for a secondary battery according to claim 1, wherein the additional metal is selected from nickel, zinc and silver.

6. The component for a secondary battery according to claim 1, further comprising an insulating tape to cover the lead-free soldering bridge, the gap, or both.

7. A secondary battery comprising:
   an electrode assembly in which a cathode lead and an anode lead are electrically coupled to each other; and
   a packing for sealing the electrode assembly to externally expose a part of the cathode lead and the anode lead,
   wherein the component for a secondary battery of claim 1 is used as the cathode lead, the anode lead, or both.

8. A multi battery system having a plurality of secondary batteries, comprising:
   a connector for connecting the plurality of secondary batteries to each other in series, in parallel, or both,
   wherein the component for a secondary battery of claim 1 is used as the connector.

9. The multi battery system according to claim 8, wherein the multi battery system is used as a power source of power tools; vehicles powered by electricity including electric vehicles (EV), hybrid electric vehicle (HEV) and plug-in hybrid electric vehicles (PHEV); electric trucks; or power storage apparatuses.

10. The component for a secondary battery according to claim 1, wherein the top surface of the lead-free soldering bridge faces a same direction as the top surfaces of the first and second metal plates.

11. The component for a secondary battery according to claim 1, wherein an entirety of the top surface of the lead-free soldering bridge is not covered by the first and second metal plates.

* * * * *